United States Patent
Gordon et al.

(10) Patent No.: US 11,570,179 B2
(45) Date of Patent: Jan. 31, 2023

(54) SECURE TRANSFER USING MEDIA ACCESS CONTROL SECURITY (MACSEC) KEY AGREEMENT (MKA)

(71) Applicant: Schweitzer Engineering Laboratories, Inc., Pullman, WA (US)

(72) Inventors: Colin Gordon, Katy, TX (US); Paul Stoaks, Moscow, ID (US); Dennis Gammel, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 137 days.

(21) Appl. No.: 17/151,481

(22) Filed: Jan. 18, 2021

(65) Prior Publication Data

US 2022/0232009 A1  Jul. 21, 2022

(51) Int. Cl.
*H04L 9/40* (2022.01)
*H04L 9/08* (2006.01)

(52) U.S. Cl.
CPC .......... *H04L 63/102* (2013.01); *H04L 9/0847* (2013.01); *H04L 63/083* (2013.01); *H04L 63/101* (2013.01); *H04L 63/123* (2013.01)

(58) Field of Classification Search
CPC ... H04L 63/102; H04L 9/0847; H04L 63/083; H04L 63/101; H04L 63/123; H04L 63/108; H04L 63/162; H04L 9/083; H04L 9/0838; H04L 9/0863; H04L 9/3234; H04L 63/062; H04L 63/08; H04L 9/321
See application file for complete search history.

(56) References Cited

U.S. PATENT DOCUMENTS

| | | | |
|---|---|---|---|
| 7,729,276 B2 | 6/2010 | Akyol | |
| 2010/0049964 A1* | 2/2010 | Kondapalli | H04L 63/162 |
| | | | 709/236 |
| 2017/0099647 A1* | 4/2017 | Shah | H04W 12/069 |
| 2017/0366342 A1* | 12/2017 | Gehrmann | H04L 63/0435 |
| 2018/0145981 A1* | 5/2018 | Du | H04L 67/12 |
| 2018/0375842 A1* | 12/2018 | Aschauer | H04L 63/0272 |
| 2019/0116183 A1 | 4/2019 | Hussain | |
| 2019/0173860 A1* | 6/2019 | Sankaran | H04L 63/0272 |
| 2019/0190910 A1* | 6/2019 | Min | H04L 63/062 |
| 2019/0342101 A1 | 11/2019 | Hayes | |
| 2020/0106719 A1 | 4/2020 | Acharya | |
| 2020/0195616 A1* | 6/2020 | Edgar | H04L 63/08 |

(Continued)

OTHER PUBLICATIONS

Moriera et al.; "Cyber-security in substation automation systems", Nov. 2015, Renewable and Sustainable Energy Reviews, pp. 1552-1562. (Year: 2015).*

(Continued)

*Primary Examiner* — Matthew Smithers
(74) *Attorney, Agent, or Firm* — Bradley W. Schield; Richard M. Edge

(57) ABSTRACT

A key server device obtains authorization information of a user associated with an intelligent electronic device (IED). The key server communicates the authorization information to the IED, via a Media Access Control Security (MACsec) Key Agreement (MKA) protocol to allow the IED to authenticate the user. The key server receives one or more commands from the user. The key server communicates the one or more commands to the IED to allow the IED to perform operations based on the one or more commands.

20 Claims, 6 Drawing Sheets

(56) References Cited

U.S. PATENT DOCUMENTS

| | | | |
|---|---|---|---|
| 2020/0236537 A1* | 7/2020 | Lee | H04W 12/0471 |
| 2020/0280566 A1* | 9/2020 | Raj | H04L 63/0457 |
| 2020/0358764 A1* | 11/2020 | Hojilla Uy | H04L 9/0866 |
| 2021/0176255 A1* | 6/2021 | Hill | H04L 9/3234 |
| 2021/0211279 A1* | 7/2021 | Nix | H04L 67/125 |
| 2021/0218717 A1* | 7/2021 | Hill | H04L 9/0822 |
| 2021/0218737 A1* | 7/2021 | Bhagvath | H04W 12/0433 |
| 2021/0351921 A1* | 11/2021 | P N | H04L 9/0827 |
| 2021/0359508 A1* | 11/2021 | Nelms | H02H 7/261 |
| 2021/0391984 A1* | 12/2021 | Florit | H04L 9/083 |
| 2022/0116391 A1* | 4/2022 | Gordon | H04L 63/0435 |
| 2022/0140863 A1* | 5/2022 | Gordon | H04L 9/0838 |
| | | | 375/257 |
| 2022/0158826 A1* | 5/2022 | Gordon | H02J 3/003 |

OTHER PUBLICATIONS

Cho et al. "Post-quantum MACsec Key Agreement for Ethernet Networks", 2020, ACM, pp. 1-6. (Year: 2020).*

* cited by examiner

SECURE TRANSFER USING MEDIA ACCESS CONTROL SECURITY (MACSEC) KEY AGREEMENT (MKA)

TECHNICAL FIELD

The present disclosure relates generally to ethernet communication, more particularly, to securing transfer of authorization information using Media Access Control Security (MACsec) and MACsec Key Agreement (MKA).

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
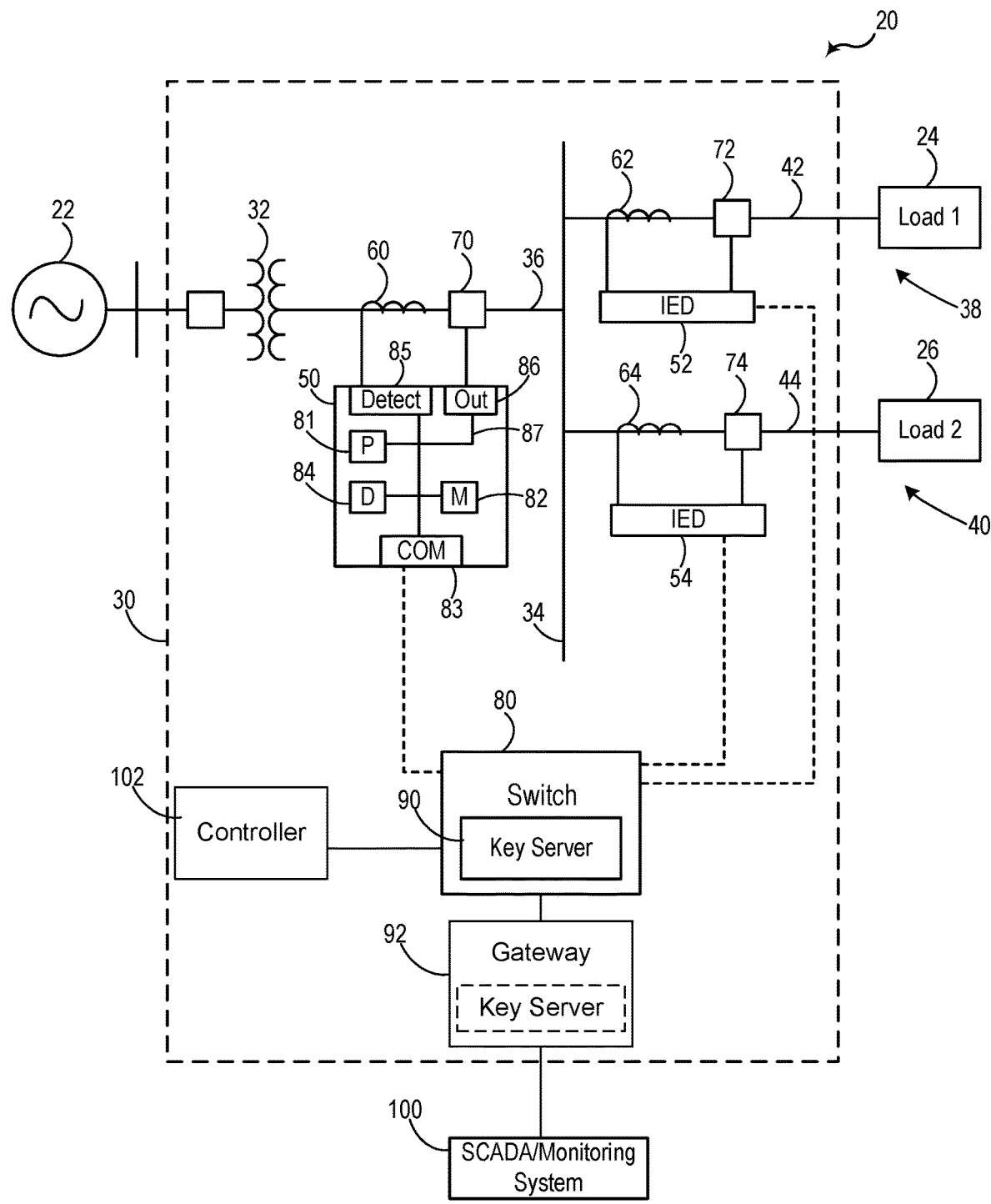
FIG. 1 is a one-line diagram of an electric power delivery system having intelligent electronic devices (IEDs) that communicate over a communication network, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Various intelligent electronic devices (IEDs) may be used in monitoring, control, and protection of the power delivery system. For example, IEDs may obtain voltage measurements and/or current measurements and trip circuit breakers to disconnect electrical equipment to protect the electric power delivery system from exceeding designed operating conditions due to faults.

IEDs may communicate with each other and other electronic devices to facilitate the monitoring, control, and protection of the power delivery system. For instance, IEDs may be connected to a wired Ethernet network, via a network switch, that receives data from a sending IED and forwards the received data to a destination IED. The IEDs may communicate power system data, such as voltage measurements, current measurements, circuit breaker statuses, and circuit breaker commands, among others, to allow the IEDs to better control and protect the power system.

Authorization information may be used at IEDs to ensure that an operator or device is authorized to perform various tasks. In some power systems, tokens may be used to ensure that an operator is in fact authorized to perform various commands on the power system. For example, tokens may indicate that a particular operator is allowed to retrieve logs, inspect power system data, perform control operations, or disconnect parts of the power system for testing. However, it may be inconvenient to access some devices that use tokens.

Further, network access to IEDs may not be controlled using a firewall or router leaving them unprotected. Some of these IEDs may be otherwise inaccessible, such as due to the location or not being network-enabled. For example, motor controllers may be connected to other IEDs but not to a network. Accordingly, there is a need in the field to facilitate access to authorization information at different devices on the power system.

To communicate, IEDs may send the power system data encapsulated in frames of a data link layer of a network. The data link layer may refer to layer two of the open systems interconnection (OSI) architecture model. To improve security, IEDs may communicate the power system data according to the 802.1AE Institute of Electrical and Electronics Engineers (IEEE) Media Access Security (MACsec) frame format on the data link layer. Data communicated using MACsec frames may include an encrypted payload as well as additional header information.

As explained below, devices, such as IEDs, switches and gateways, may use MACsec key agreement (MKA) to configure MACsec links, and provide secure communication of authorization information. For example, a key server may obtain authorization information of a user associated with an IED. The key server communicates the authorization information to the IED via MKA protocol. The key server may receive one or more commands from the user. The key server may then communicate one or more commands to the IED to allow the IED to perform the commands according to the authorization information.

FIG. 1 is a one-line diagram of a power system 20 that includes a power source 22, such as a distributed generator, that generates and provides power to loads 24 and 26, in accordance with an embodiment. The power system 20 may include equipment, such as electrical generators, transformers, power lines (e.g., transmission and distribution lines), circuit breakers, buses, loads, and the like. A variety of other types of equipment may be included in the power system 20, such as voltage regulators and capacitor banks, among others.

As illustrated, the power source 22 may provide power, via a substation 30, to power the loads 24 and 26. The substation 30 includes a transformer 32 that steps up or steps down the voltage to be provided to a bus 34 via power line 36. Various feeders 38 and 40 may be electrically connected to the bus 34 to provide power to the loads 24 and 26 via power lines 42 and 44. Although illustrated in single-line form for purposes of simplicity, power system 20 may be a multi-phase system, such as a three-phase electric power delivery system.

The power system 20 may be monitored by one or more IEDs 50, 52, and 54, although additional IEDs may also be utilized. As used herein, an IED (such as IEDs 50, 52, and 54) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs. The IEDs 50, 52, and 54 may obtain electric power system data using current transformers (CTs) 60, 62, and 64, and potential transformers (PTs), and the like. The IEDs 50, 52, and 54 may detect events, such as fault events, on the power lines 36, 42, and 44 using current and voltage signals from the CTs 60, 62, and 64 and/or the PTs. The IEDs 50, 52, and 54 may be communicatively coupled to circuit breakers (CBs) 70, 72, and 74 to send control signals to the CBs 70, 72, and 74 to open (i.e., trip) or close the CBs 70, 72, and 74 based on the power system data.

The IED 50 may further include one or more processors 81, a computer-readable medium (e.g., memory 82), a communication interface 83, a display terminal 84, detection circuitry 85, and output circuitry 86 communicatively coupled to each other via one or more communication buses 87. The processor 81 may be embodied as a microprocessor, a general-purpose integrated circuit, an application specific integrated circuit (ASIC), a field programmable gate array (FPGA), and/or other programmable logic devices. It should be noted that the processor 81 and other related items in FIG. 1 (e.g., the memory 82) may be generally referred to herein as "processing circuitry." Furthermore, the processing circuitry may be a single contained processing module or may be incorporated wholly or partially within any of the other elements within the IED 50. It should be noted that FIG. 1 is merely one example of a particular implementation and is intended to illustrate the types of components that may be present in the IED 50.

In the IED 50 of FIG. 1, the processor 81 may be operably coupled with the memory 82 to perform various algorithms. Such programs or instructions executed by the processor 81 may be stored in any suitable article of manufacture that includes one or more tangible, computer-readable media at least collectively storing the instructions or routines, such as the random-access memory (RAM) and the read-only memory (ROM).

In the illustrated embodiment, the IED 50 includes detection circuitry 85 that detects various electrical conditions of the power line 36 based on the input signals. The detection circuitry 85 may include a current conversion circuit (e.g., a transformer) that transform the input signals to levels that may be sampled by the IED 50. The detection circuitry 85 may include analog-to-digital converter(s) that sample the current and voltage signals and produce digital signals representative of measured current and measured voltage on the power line which may be transmitted to the processor 81. The IED 50 may compare the current measurements to thresholds to detect faults and to disconnect the bus 34 from the power source 22. For example, if current on one or more phases exceeds a preset threshold and/or current-over-time exceeds a preset threshold, the processor 81 may detect a fault event and send a signal, via the output circuitry 86, to open the CB 70.

In some embodiments, the IED 50 may include a communication interface 83, such as an ethernet port, to communicate with other IEDs. Further, the IED 40 may include a display terminal 86 and input structures (e.g., Universal-Serial-Bus (USB) ports, buttons, touchscreens, etc.) to allow operators to review events on the power line, change settings, etc.

Each of the IEDs 52 and 54 may have similar components (e.g., processor 81, memory 82, communication interface 83, display 84, detection circuitry 85, and output circuitry 86) to those described with respect to IED 50 to allow the IEDs 52 and 54 to obtain power system measurements, control the CBs 72 and 74, and to communicate. In some embodiments, the IEDs 50, 52, and 54 may communicate power system data via a communication network.

In the illustrated embodiment, the IEDs 50, 52, and 54 may be connected to a switch 80 to form a wired network. The switch 80 may receive frames of power system data from a sending IED and forward the power system data to a receiving IED For example, IED 50 may send and/or receive power system data to or from IEDs 52, and 54, such as voltage measurements, current measurements, and circuit breaker status, among others. If IED 52 were to detect a fault, IED 52 may communicate the fault event to IED 50 and the status of CB 72 via the wired network. If the CB 72 opens, the IED 50 may keep CB 70 closed to allow power to continue to be delivered to load 26. If IED 52 detects a fault and CB 72 remains closed, IED 50 may respond by opening CB 70, thereby isolating the fault. The IED 50 may respond to fault events faster due to the communication network, thus improving the reliability of the power system 20.

The switch 80 may include switching hardware and forwarding circuitry, which may include one or more processors, memory, and communication ports that allow the switch 80 to receive and forward power system data to a receiving device. The switch 80 may be embodied as a managed switch or an unmanaged switch.

The switch 80 may operate as an MKA key server 90 that manages MACsec frame communication on the switch 80 via MACsec keys. In other embodiments, the key server 90 may be embodied as a gateway, a remote terminal unit (RTU), or the like. For example, a gateway may be an electronic device that operates as an access control that authorizes access or prevents unauthorized access onto the communication network from remote devices, such as a supervisory control and data acquisition (SCADA) system 100. The key server 90 may operate using hardware of the switch 80 or the gateway 92 or may include separate hardware to communicate MACsec keys. In certain embodiments, a controller 102, such as an SDN controller, may manage the communication network, based on inputs from a user, by sending control instructions to the switch 80. In some embodiments, the key server 90 may be a part of an intrusion detection system (IDS) that prevents intruders on the network by inspecting the messages. In certain embodiments, the controller 102 may also be a key server.

Figure 2:
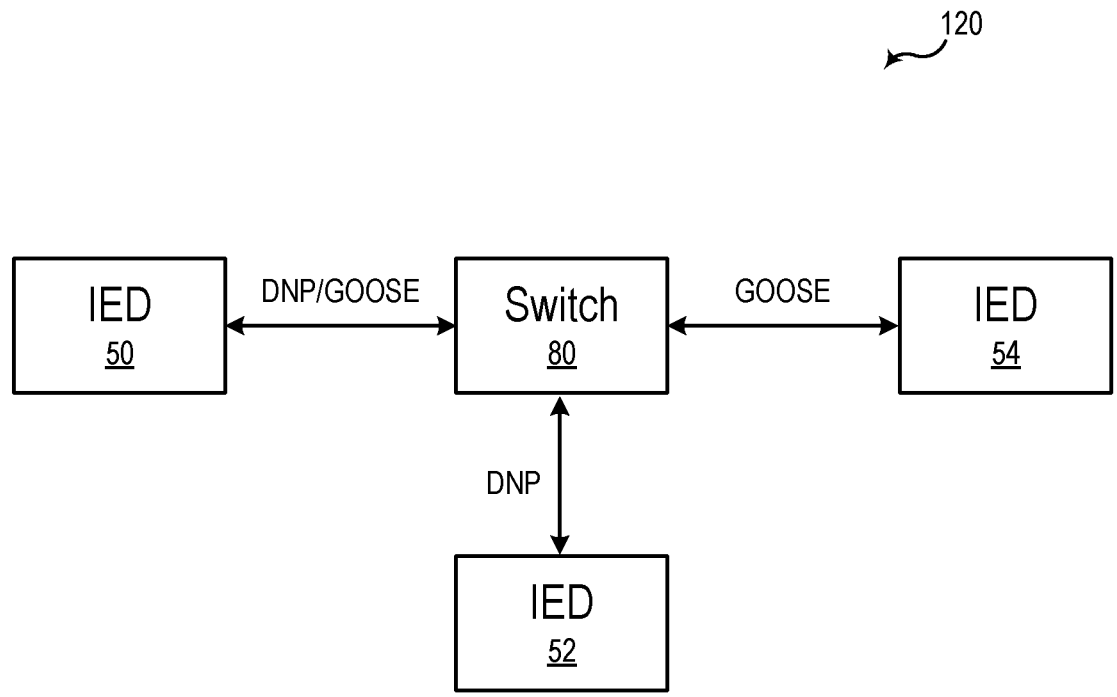
FIG. 2 is a network diagram of the communication network of FIG. 1, in accordance with an embodiment.

FIG. 2 is a block diagram of the communication network 120 of communication through the switch 80. Communication frames of different application protocols may be sent on the communication network 120, which may depend on the device and the configuration. For example, the IED 50 may communicate frames of a DNP application protocol with IED 52 and communicate frames of a GOOSE application protocol with IED 54. Any suitable combination of application protocols may be used depending on the implementation of the power system 20. MACsec frames may be used to communicate power system data between each of the IEDs 50, 52, and 54 on the communication network 120.

Figure 3:
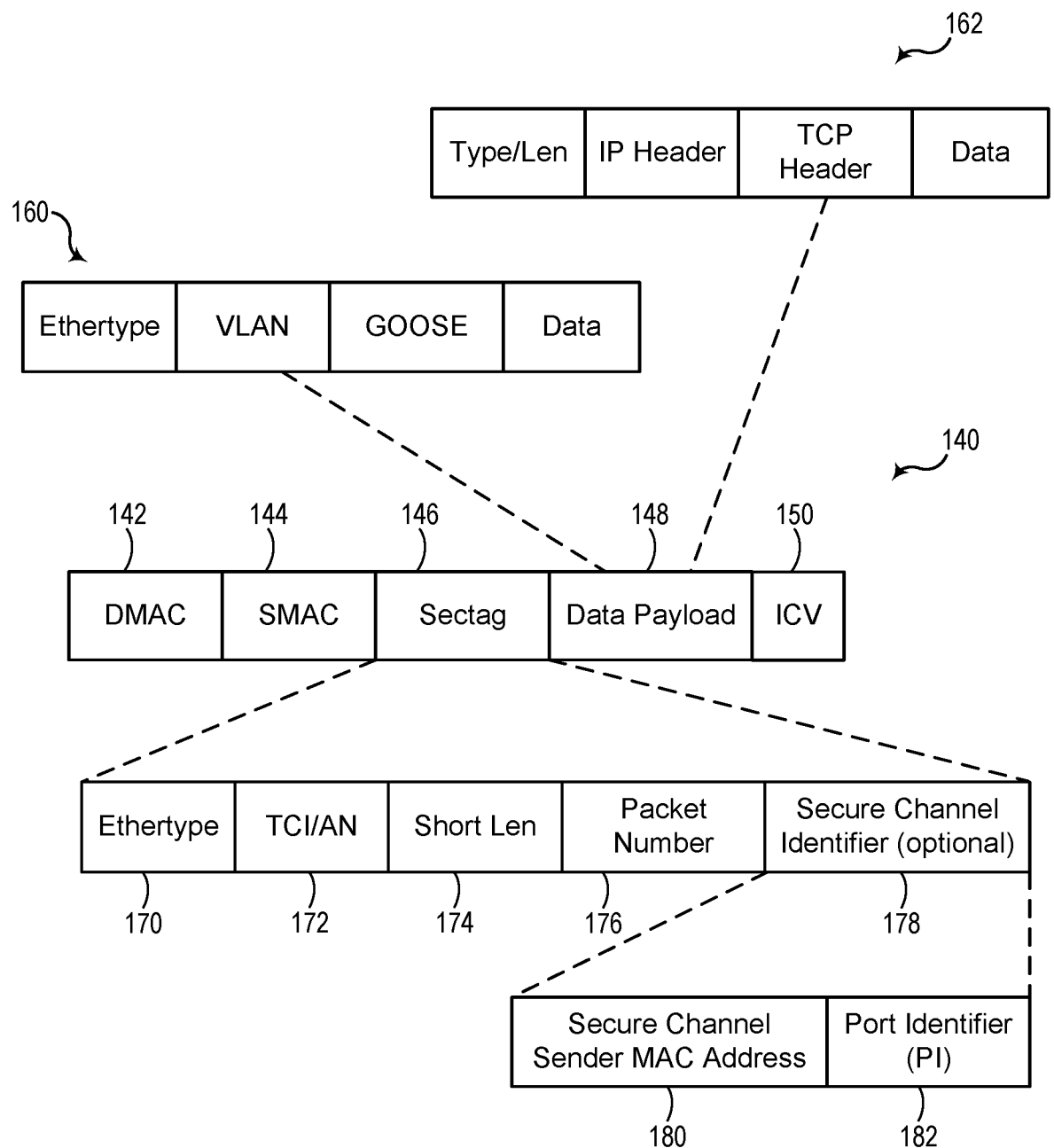
FIG. 3 is a layout of a Media Access Control Security (MACsec) frame that may be communicated on the communication network of FIG. 1, in accordance with an embodiment.

FIG. 3 is a field layout of an embodiment of a MACsec frame 140 that may be used in the communication network 120 of the power system 20. The MACsec frame 140 may include a destination MAC address 142, a source MAC address 144, a security tag (Sectag) 146, an authenticated and (optionally) encrypted payload 148, and an integrity check value (ICV) 150. The MAC address may be a unique identifier of a network interface controller (NIC) of the device. The MAC address may be stored in firmware or ROM by the manufacturer of the device. Some or all of the payload 148 may be encrypted depending on the application protocol of the MACsec frame. For example, MACsec frames communicating GOOSE messages 160 may include a first set of header fields and MACsec frames communicating DNP messages 162 may include a second set of header fields, different from the first set of header fields.

The Sectag 146 may include an Ethertype 170, a TCI/AN, a short len 174, and a packet number 176, which may be used to identify the decryption key and detect transmission of repeated frames. Further, in MACsec frames 140, the Sectag 146 may include a secure channel identifier 178, which is an optional field. The secure channel identifier 178 may include a secure channel sender MAC address 180 and a port identifier (PI) 182. The ICV 150 may ensure the integrity of the MACsec frame 140 by allowing the recipient to detect errors in the transmission process.

MACsec key agreement (MKA) protocol may be used to establish a connectivity association (CA) that connects peer-to-peer devices in the communication network 120. The MKA protocol may be used to communicate additional authorization information between MACsec-enabled devices in power systems to improve security of the network. A first technique involves using MKA to communicate token-based authentication (TBA) information to electronic devices to ensure commands performed on a receiving device are authenticated. Another technique involves using MKA to communicate access control information between MACsec-enabled devices to limit authorized communication with the receiving device.

Figure 4:
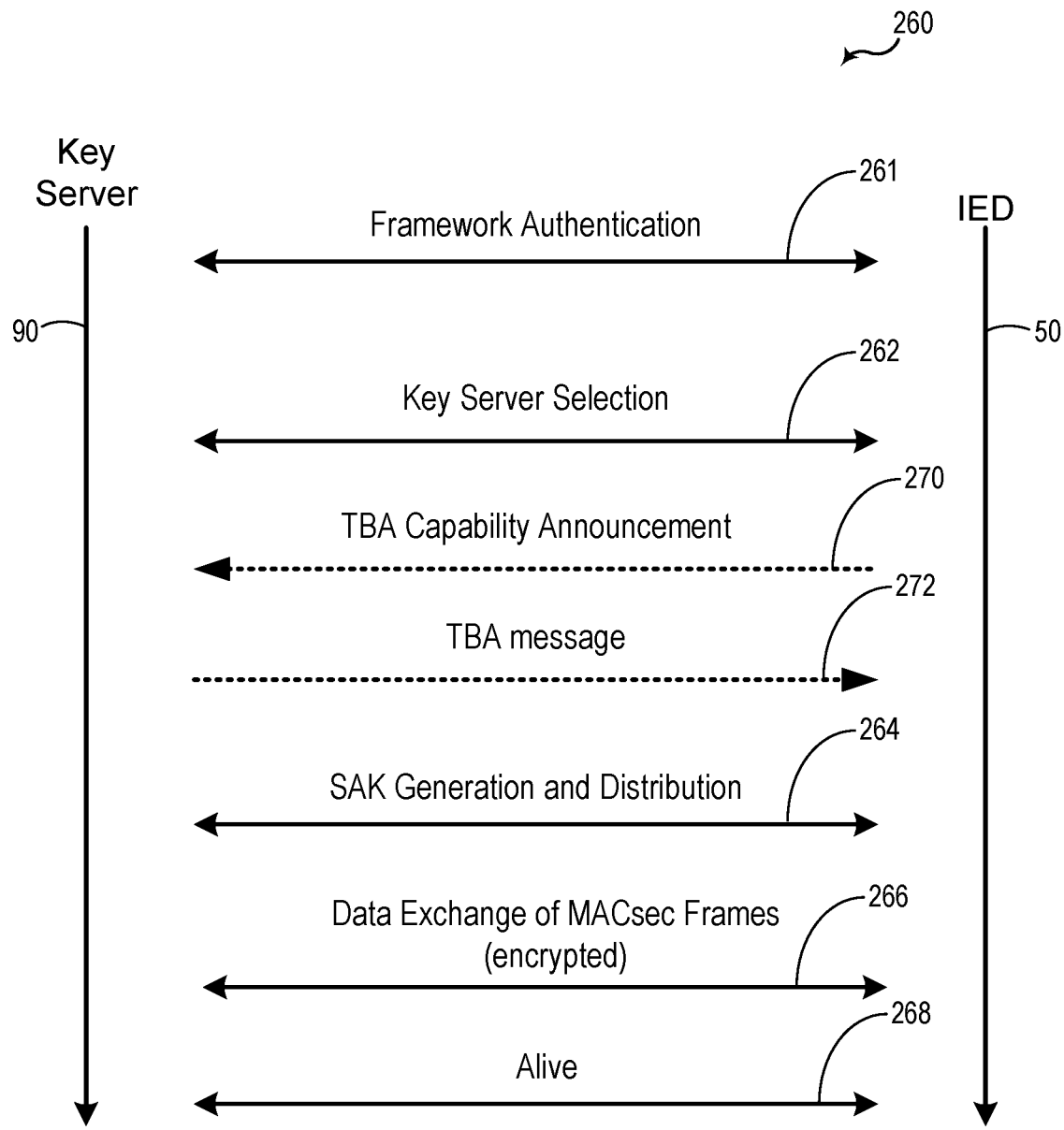
FIG. 4 is a timing diagram of an MACsec Key Agreement (MKA) process used to perform a secure token transfer over the communication network of FIG. 1, in accordance with an embodiment.

FIG. 4 is a timing diagram 260 of the MKA protocol performed between a key server 90, such as the switch 80, and an IED 50 to establish a CA to communicate TBA information. Before MKA begins, framework authentication may occur in which each of the devices authenticate the other (arrow 261). For example, secure pre-shared key (PSK) authentication may be used in which each device uses shared keys to ensure that the devices are in fact allowed on the communication network 120. As another example, a master session key (MSK) may be obtained from an extensible authentication protocol (EAP) session. The MSK may then be used to determine a connectivity association key (CAK) for the MKA process. In another case, a user-entered passcode may be used to derive a CAK.

Following the framework authentication, the MKA process may begin with the peer-to-peer devices selecting a key server 90. In the illustrated embodiment, the switch 80 may be selected as the key server 90 (arrow 262). The process may continue with the key server 90 generating secure association keys (SAKs), which may refer to a random value or one that is generated based on the CAK. The key server 90 may then distribute the SAK to any of the peer connected devices on the communication network 120 (e.g., IEDs 50, 52, and 54), thereby establishing a MACsec link between the key server 90 and the IED 50 (arrow 264).

The key server 90 and the IED 50 may then exchange power system data via MACsec frames (arrow 266). The key server 90 and the IED 50 may further continue to send keep alive signals indicating that the CA is still alive (arrow 268). The MKA process may be repeated for each of the application protocols (e.g., telnet, GOOSE, DNP, Modbus TCP, etc.) that are used to communicate between the key server 90 and the IED 50. Each of the application protocols may be associated with a unique MKA CA. Upon using the MKA to establish a CA for each of the application protocols, the devices may communicate via the CA.

In some embodiments, after adoption where the IED 50 is accepted onto the MKA connectivity association and hence onto the communication network 120, IED 50 may continue to announce the enabled ports, protocols, and/or services at periodic intervals. Further, the key server 90 and the IED 50 may form a separate device management CA that is used to communicate management data over the communication network 120. The announcements may be encrypted with a key-encrypting key (KEK) derived from a CAK, which may be shared with each of the devices to facilitate management of the communication network 120.

As mentioned above, the MKA process may also be used to communicate authorization information associated with the IED 50 to improve security of the IED 50. For example, the MKA process may be used to communicate token-based authentication information in conjunction with another device. In a direct token-based authentication method, the key server 90 may receive a token from a user and send the token to the IED 50 to allow the IED 50 to ensure that the user is in fact authenticated to perform the commands being sent. In an indirect method token-based authentication method, the key server 90 may determine whether the user is in fact authenticated to perform the commands received and generate a token to communicate with the IED 50. The key server 90 may then relay commands from the user to cause the IED 50 to perform the authenticated commands.

As illustrated, during the initial MKA adoption negotiation, the IED 50 may communicate a token-based authentication (TBA) capability announcement message indicating that the IED 50 is capable of authenticating tokens (arrow 270). In the direct method, the key server 90 may receive the message indicating that the IED 50 is capable of authenticating tokens. After a period of time, the key server 90 may then send a TBA-distribution message to securely transfer the user token to the IED 50 (arrow 272) to allow the IED 50 to authenticate the user. The key server 90 may then forward the commands, as MACsec frames over the CA, entered by the user and allow the IED 50 to determine whether the user is authorized to perform the entered commands.

In the indirect method, the key server 90 may generate a token for the user to communicate with the IED 50. The key server 90 may then operate as a proxy and translate commands to send to the IED 50. For example, some IED 50s may not have TBA capabilities and may receive token-based authenticated commands from the key server 90 after the key server 90 authenticates the token. In such embodiments, the IED 50 may communicate that the IED 50 does not have TBA capabilities (arrow 270). The IED 50 may then determine that the token is authentic and that the user is permitted to perform the commands of the token (e.g., based on time limits and privileges which may be established by the key server 90). The key server 90 may then generate and communicate MACsec frame messages, over the CA, indicating commands for the IED 50 to perform based on authentication of the token 288.

Figure 5:
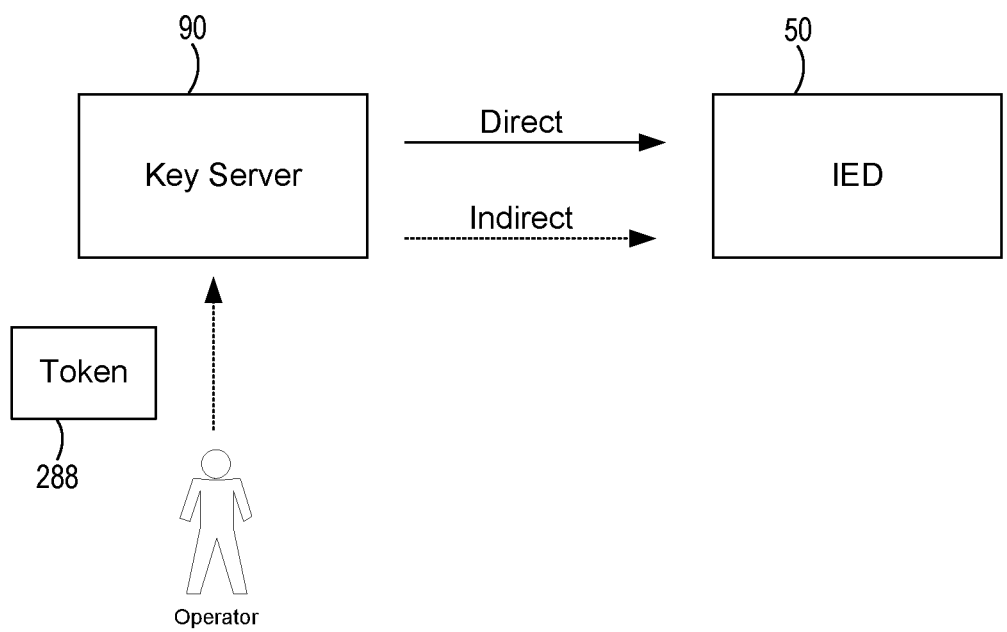
FIG. 5 is a block diagram of methods in which token-based authentication is secured using MKA, in accordance with an embodiment.

FIG. 5 is a block diagram illustrating different methods in which token-based authentication may be used with MKA protocol to communicate with the IED 50. As illustrated, an operator may provide a token 288 to a key server 90, such as the switch 80 or gateway 92. The direct method to communicate authentication information may be used in cases, for instance, where the IED 50 is not accessible via the network 120 or physical location. For example, some motor controllers may have token-based authentication capabilities in which the controllers can determine that a token is authentic and are installed inaccessible to other devices. In such cases, an operator may provide authorization information (e.g., a token) to the key server 90. The key server 90 may receive the token 288 and an indication that the token is associated with IED 50. The key server 90 may perform the MKA process with IED 50 upon receiving the token 288. In the direct method, the key server 90 may receive a message from the IED 50 that the IED 50 is capable of authenticating tokens, and the key server 90 may communicate the token 288 via a type-length-value (TLV) message or MKA message with a specific Parameter Set to the IED 50. The key server 90 may receive a command from the user and forward the command to the IED 50 in MACsec frame on the CA according to a preset protocol between the key server 90 and the IED 50. The IED 50 may determine whether the user is authorized to perform the command. If the user is authorized to perform the command, the IED 50 may perform the command and send an acknowledgement to the key server 90 to convey to the user. If the token is determined to be inauthentic or the user is not authorized to perform the command, the IED 50 may send a message to the key server 90 to notify the user and/or to notify an intrusion detection system (IDS). For example, the user may not be authorized due to a time limit of the token expiring, the user entering an unauthorized command, or the like.

Similarly, the indirect method may allow devices that are otherwise inaccessible to communicate with an operator. In such cases, the key server 90 may receive inputs from the user to communicate with the IED 50. Based on authentication information from the user, the key server 90 may generate a token to authenticate the user with the IED 50. The key server 90 may then communicate the token via a type-length-value (TLV) message or MKA message with a specific Parameter Set to the IED 50.

The key server 90 may then communicate the commands securely over a CA with the IED 50. By using the key server 90 as a proxy, commands to the IED 50 may be secured by using MKA communication. Further, by generating the token via the key server 90, the user can be authenticated using authentication credentials, which may be further restricted by the token (e.g., with a time expiration of the token). In addition to TBA, MKA may be used to secure communication of other authorization information, such as access control lists. As explained below, by communicating access control lists with IEDs over MKA, IEDs without routers or firewalls available may be protected from unauthorized users. The key server 90 may obtain the access control list from a user or from another electronic device. For example, the key server 90 may obtain the access control list remotely via the gateway 92. The key server 90 may then establish a connection association via the MKA protocol to communicate the access control list to IED 50.

Figure 6:
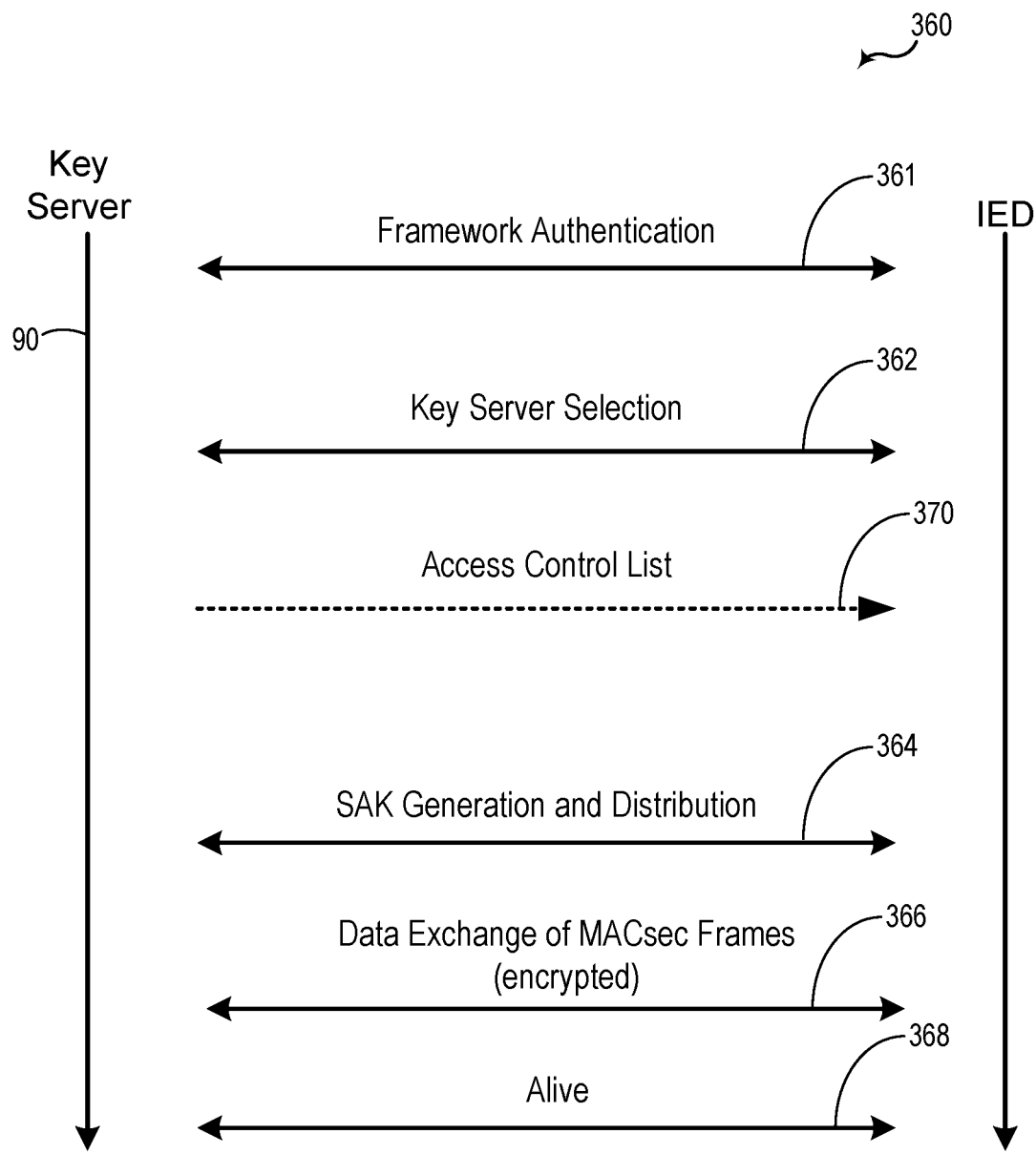
FIG. 6 is another timing diagram of the MKA process used to transfer an access control list over the communication network of FIG. 1, in accordance with an embodiment.

FIG. 6 is another timing diagram 360 of MKA protocol performed between a key server 90, such as the switch 80, a gateway, or another IED, and the IED 50 to establish a CA to communicate access control list information. Each of the arrows 361, 362, 364, 366, and 368 may include steps performed the same or similar to corresponding steps 261, 262, 264, 266, and 268 of FIG. 4.

Further, the key server 90 may generate a TLV message from the access control list to communicate the access control list to IEDs via an MKA type-length-value (TLV) message or MKA message with a specific Parameter Set (arrow 370). The access control list may include white listed MAC addresses, internet protocol (IP) addresses, and transmission control protocol (TCP)/user datagram protocol (UDP) ports. For example, the access control list may indicate which IP addresses are allowed to connect to the IED 50 and over what logical TCP/UDP ports, or what physical ports are allowed to communicate. The access control list may be encrypted with the KEK derived from the CAK.

The IED 50 may limit communication based on the received access control list. For example, the IED 50 may receive a message that includes a MAC address, IP address, or port indicating a source of the message. The IED 50 may compare the source information of the message with the access control list information to determine whether to access or reject the message. If the message is allowed according to the access control list, the IED 50 may perform the command associated with the message. If the message is not allowed according to the access control list, the IED 50 may communicate the attempted message to an intrusion detection system. In some embodiments, the access control list may be encrypted with a CAK which may be shared with an intrusion detection system. By communicating access control list information to IEDs, the IEDs may better limit communication on the communication network, thereby improving security of the network.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A key server, comprising:
   a memory; and
   a processor operatively coupled to the memory, wherein the processor is configured to execute instructions stored on the memory to cause operations comprising:
   obtaining authorization information of a user associated with an intelligent electronic device (IED) for monitoring or protection of electric power equipment of an electric power delivery system, the authorization information to ensure that the user is authorized to perform a task with the IED;

communicating the authorization information to the IED, via a Media Access Control Security (MACsec) Key Agreement (MKA) protocol, to allow the IED to authenticate the user;

receiving one or more commands from the user, the commands to be performed on the electric power delivery system; and communicating the one or more commands to the IED to allow the IED to perform operations based on the one or more commands.

2. The key server of claim 1, wherein transmitting the authorization information comprises sending the authorization information in an MKA message with a parameter set indicating that the message includes the authorization information.

3. The key server of claim 1, wherein the authorization information comprises token based authentication (TBA) information.

4. The key server of claim 1, wherein the TBA information comprises:

privilege information that indicates that the user is allowed to perform the one or more commands on the IED; and authentication information that allows the TBA information to be verified that it is authentic.

5. The key server of claim 4, wherein the processor is configured to execute instructions stored on the memory to cause operations comprising transmitting the TBA information and the one or more commands to the IED to allow the IED to determine authenticity of the TBA information and to perform the one or more commands upon verifying the authenticity.

6. The key server of claim 4, wherein the processor is configured to execute instructions stored on the memory to cause operations comprising:

receiving password information from the user; and generating the authentication information associated with the IED based on the password information.

7. The key server of claim 1, wherein the processor is configured to execute instructions stored on the memory to cause operations comprising transmitting an access control list as the authorization information to control communication allowed on the IED without physically accessing the IED.

8. The key server of claim 7, wherein the access control list comprises MAC addresses, internet protocol (IP) addresses, logical or physical ports, or any combination thereof indicating other devices and services allowed to be used in communication with the IED.

9. The key server of claim 1, wherein the processor is configured to execute instructions stored on the memory to cause operations comprising establishing, via MKA protocol, a connectivity association (CA) between the key server and the IED upon verifying the authorization information.

10. A non-transitory, computer readable medium, comprising instructions configured to be executed by a processor to cause operations comprising:

obtaining, via a key server, an access control list associated with an intelligent electronic device (IED) for monitoring or protection of electric power equipment of an electric power delivery system;

sending, via a Media Access Control Security (MACsec) Key Agreement (MKA) protocol, the access control list to the IED to allow a user to control access to commands of the IED; wherein the commands are to be performed on the electric power delivery system.

11. The non-transitory, computer-readable medium of claim 10, wherein the instructions are configured to be executed by the processor to cause operations comprising transmitting the access control list as authorization information to control communication allowed on the IED without the user physically accessing the IED.

12. The non-transitory, computer-readable medium of claim 10, wherein the instructions are configured to be executed by the processor to cause operations comprising sending the access control list in an MKA message with a parameter set type that indicates the message includes access control information.

13. The non-transitory, computer-readable medium of claim 10, wherein the instructions are configured to be executed by the processor to cause operations comprising cryptographic authentication and optional encryption, via the IED, the access control list using a connection association key.

14. The non-transitory, computer-readable medium of claim 10, wherein the access control list comprises MAC addresses, internet protocol (IP) addresses, ports, or any combination thereof indicating other devices and services allowed to be used in communication with the IED.

15. A method, comprising:

obtaining, via a key server, authorization information of a user associated with an intelligent electronic device (IED) for monitoring or protection of electric power equipment of an electric power delivery system, the authorization information to ensure that the user is authorized to perform a task with the IED;

communicating, via a Media Access Control Security (MACsec) Key Agreement (MKA) protocol, the authorization information to the IED to allow the IED to authenticate the user;

receiving one or more commands from the user, the commands to be performed on the electric power delivery system; and communicating the one or more commands to the IED to allow the IED to perform operations based on the one or more commands.

16. The method of claim 15, comprising establishing an MKA connection association between the key server and the IED upon verifying the authorization information.

17. The method of claim 16, comprising receiving a token as the authorization information, wherein the token comprises:

privilege information that indicates that a user is allowed to perform one or more allowed commands on the second device; and authentication information that allows the IED to verify that the token is authentic.

18. The method of claim 16, comprising sending a token-based authentication capability message from the IED to the key server indicating that the IED is capable of verifying tokens.

19. The method of claim 16, comprising automatically preventing communication between the IED and the key server when a set amount of time expires according to the authorization information.

20. The method of claim 16, comprising transmitting an access control list as the authorization information to control communication allowed on the IED without physically accessing the IED.

* * * * *